J. A. HOLLANDER.
COMBINATION AGRICULTURAL IMPLEMENT.
APPLICATION FILED JUNE 26, 1912.
1,055,044.
Patented Mar. 4, 1913.
2 SHEETS—SHEET 1.
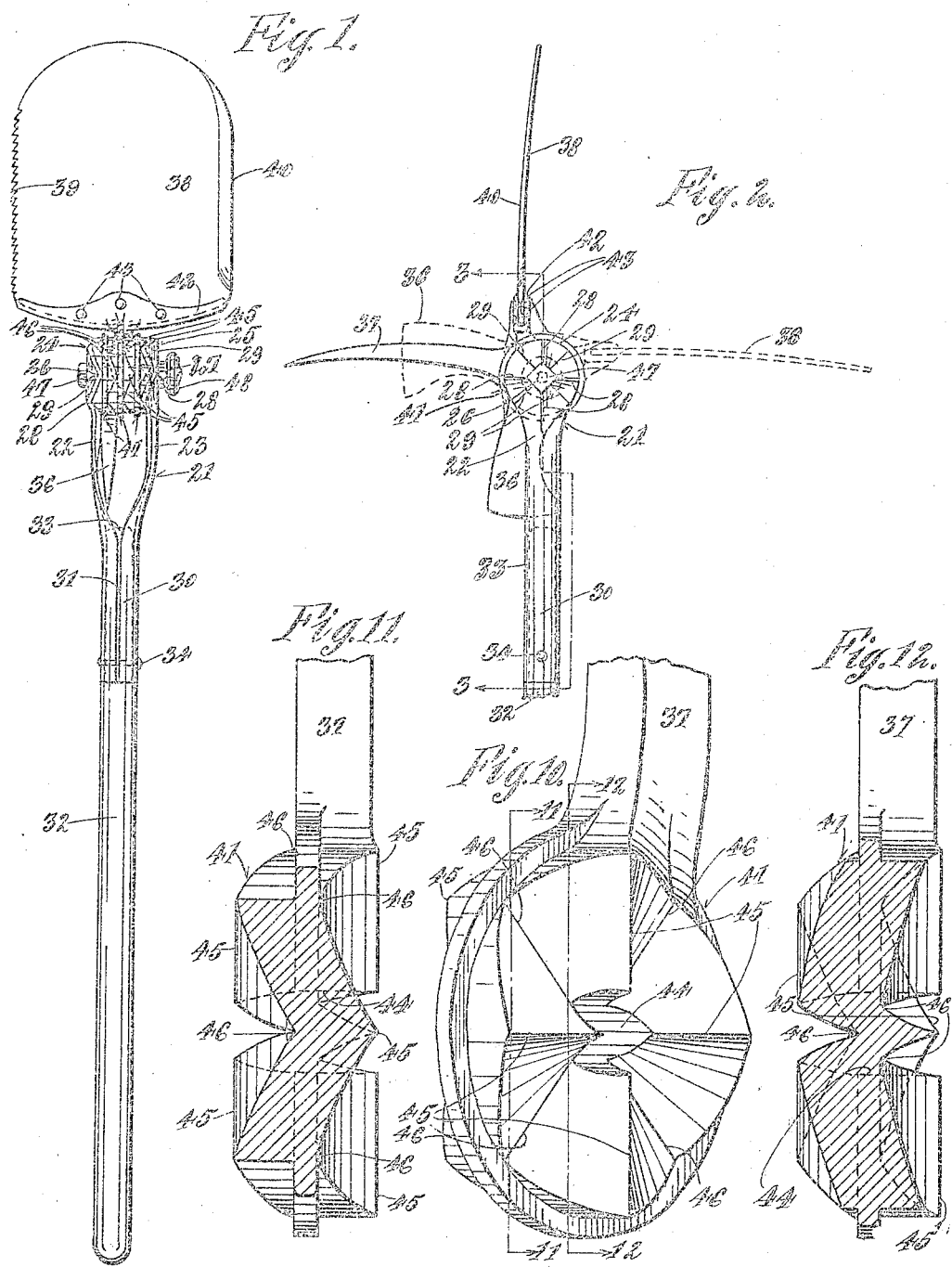

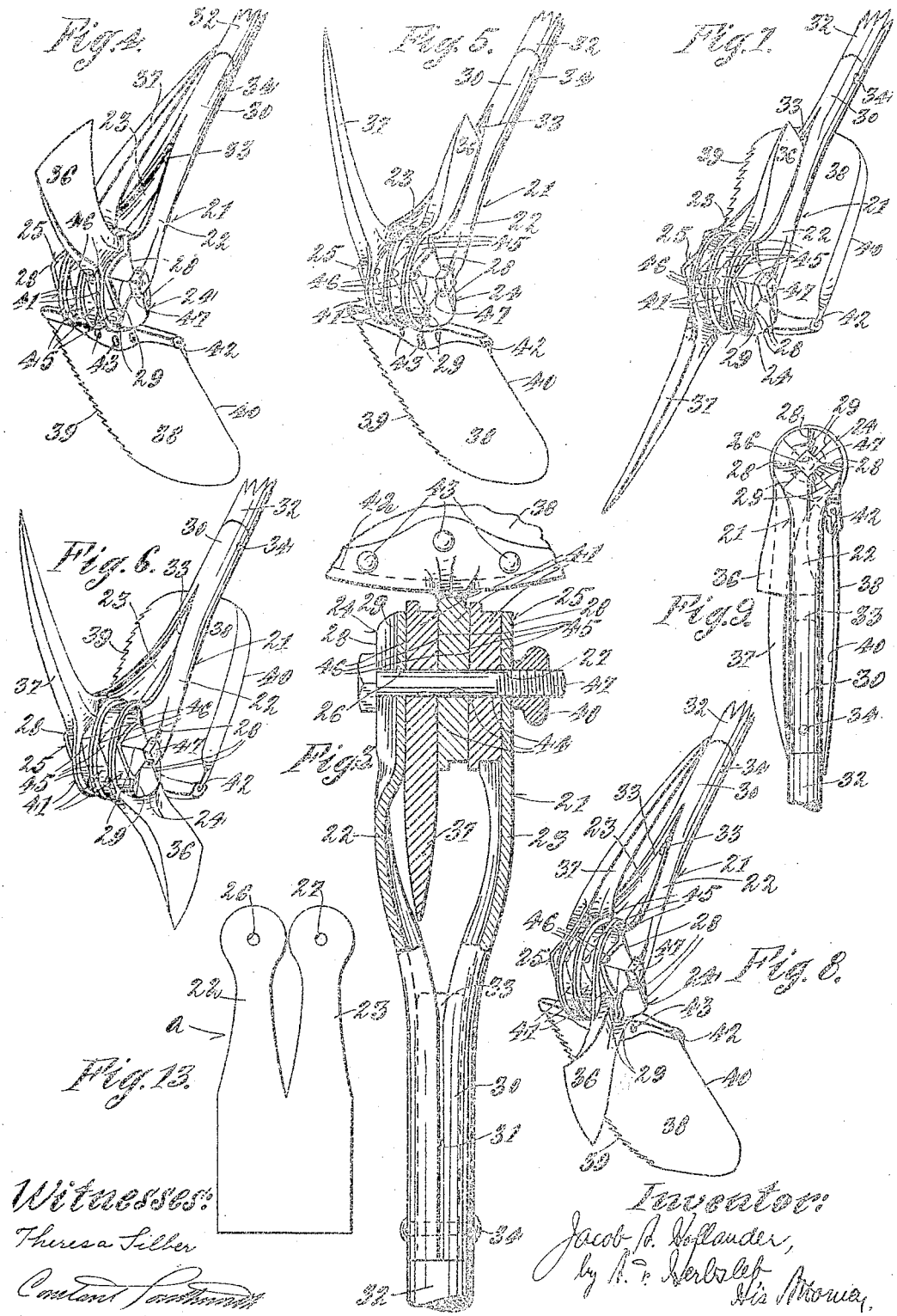

UNITED STATES PATENT OFFICE.

JACOB A. HOLLANDER, OF CINCINNATI, OHIO.

COMBINATION AGRICULTURAL IMPLEMENT.

1,055,044.   Specification of Letters Patent.   Patented Mar. 4, 1913.

Application filed June 26, 1912. Serial No. 705,926.

*To all whom it may concern:*

Be it known that I, JACOB A. HOLLANDER, a subject of the Queen of the Netherlands, residing at Cincinnati, in the county of Hamilton and State of Ohio, have invented certain new and useful Improvements in Combination Agricultural Implements, of which the following is a specification.

My invention relates to combination agricultural implements, and has for its object the provision of an agricultural implement comprising a head and a series of tools therein arranged to be adjustably placed in said head for locating any of said tools in position of use, or for placing a plurality of said tools in coöperating relation for forming a composite or two-ended tool, while maintaining all said tools either in positions of use or in idle relation in said head.

My combination agricultural implement is especially applicable for pioneers' use, for agricultural pursuits where it is desired to have a number of tools ready for convenient and interchangeable use, for campers' use, as a gardening tool, and for other purposes.

The invention will be further readily understood from the following description and claims, and from the drawings, in which latter:

Figure 1 is a side elevation of my improved device showing the shovel-tool in position for use. Fig. 2 is an edge elevation of my improved device showing the shovel-tool in position for use as a shovel or spade, the pick-tool in position for use as a pick, and the ax-tool placed in position of non-use, the ax-tool and shovel-tool being shown in co-related positions in dotted lines for use as a mattock. Fig. 3 is a detail, partly in side elevation, and partly in section on the line 3—3 of Fig. 2. Figs. 4 to 8 inclusive are perspective views showing the head-end of the implement with the tools arranged in various positions for use or idle relations. Fig. 9 is a side elevation of the head-end of my improved device, with the tools arranged in closed relations. Fig. 10 is a perspective view of the tang-head of one of the tools, the tool being broken away. Fig. 11 is a cross-section of the same on the line 11—11 of Fig. 10. Fig. 12 is a cross-section of the same on the line 12—12 of Fig. 10; and, Fig. 13 is a plan view of the blank from which the bifurcated head is struck up.

21 is a bifurcated head. This bifurcated head is struck up from a blank $a$ of sheet metal for forming side-tines 22, 23, having tang-heads 24, 25, struck up thereon at their outer ends, these tang-heads being provided with apertures 26, 27, having coincident axes, and alternate elevations 28 and depressions 29 arranged radially about said apertures. The blank for the tang-head is at its inner end formed up for forming a tube 30 provided with a longitudinal slit 31 extending longitudinally throughout the length of the tube between the longitudinal projections of said tines at one side of said tube, the opposite side of said tube being integral.

32 is a handle having a reduced end 33 received in said tube, said tube being secured at its inner end to said handle, as by means of a rivet 34.

The tools are exemplified by an ax-tool 36, a pick-tool 37, and a shovel-tool 38. The shovel-tool is shown provided with saw-teeth 39 at one longitudinal edge thereof and with a cutting edge 40 at the other longitudinal edge thereof. Each of these tools is provided with a tang-head 41. The ax-tool and pick-tool are shown integral with their tang-heads, while the shovel-tool is shown secured in a slot 42 by rivets 43.

Each of the tang-heads is provided with an aperture 44 and each side-face thereof is provided with alternate elevations 45 and depressions 46, which are shown located radially about the aperture. The elevations and depressions of the various tang-heads coöperate with one another. A bolt 47 is received through the apertures, a nut 48 thereon clamping the tang-heads together.

All of the tools are at all times located in the bifurcated head ready for adjustments to positions of use or non-use, each of the tools being arranged to be adjusted separately. Having the tools thus arranged also permits adjustment of the same into such relations that a plurality of the tools may be brought into coöperating relation for forming a composite tool or tools, having operating edges at both ends thereof.

The drawings illustrate a number of the uses to which the implement may be put. In Fig. 2 the implement is shown in full lines as adjusted for use as a pick and shovel. In each of Figs. 4, 5 and 6 the tools are shown adjusted into coöperating relation for use as a combined tool, as a mattock, shown as having various end-cutting edges at the respective ends of the head thereof. In Fig. 7 I have shown the device adjusted for use as a crow-bar by adjusting the pick-tool into a position extending outwardly parallel to the handle, the other tools being adjusted into positions of non-use. In Fig. 8 the device is shown adjusted for use as a tree-pruner and scraper, the ax-tool being adjusted to extend outwardly lengthwise of the handle and the shovel-tool to extend crosswise of the handle. In Fig. 9 the tools are all shown adjusted into idle or closed positions for carrying or transporting the implement.

It will be further noted from Figs. 1, 2, 3, 5, 7 and 9, that the cutting edge of the ax-tool, when in idle relation, is received partway between the side-tines of the bifurcated head, thereby economizing in space and enhancing safety, the pick-tool being also adjustable to a position alongside the exposed part of the cutting edge of the ax-tool when adjusted into idle relation for further protecting said edge.

If it is desired to adjust one or more of the tools, all that is necessary is to partly unscrew the nut so as to permit a separation of the tines of the bifurcated head. The tool it is desired to adjust is then shifted about the axis of its tang-head about the bolt.

In order to provide ease of movement of any tool about its axis when adjusting the same, the elevations and depressions preferably form teeth whose side faces describe helices of equal pitch throughout their surfaces. These teeth are of equal height throughout their lengths, the side edges of the bases and the apices thereof being radial to the axes of said tang-heads, whereby coacting depressions and elevations of equal size are formed on opposite sides of said tang-heads whose side faces have less inclination to a plane at right angles to said axes at their peripheral than at their inner ends. (See Figs. 10, 11 and 12.) The opposite sides of the teeth describe helices in opposite and crossing directions. The construction is such that when the elevations are received in the depressions, the opposing faces of the teeth will contact each other throughout the areas of their opposed surfaces, a maximum amount of bearing surfaces having changing curvatures radially of the teeth being presented.

The helical curvatures permit very ready shifting of the tools about their axes with relation to each other, the resilience of the tines of the bifurcated head permitting the climbing of the elevations of each of said tang-heads upon the elevations of its neighboring tang-head, the coöperating elevations and depressions being preferably so formed that each tool is capable of being placed in four positions, three of which are positions of use, one lengthwise and two crosswise of the handle, and the fourth a position of non-use lengthwise of the handle. When the shifting of any of the tools takes place, the tines are spread, this resilience of the tines being aided by the manner of forming the head out of sheet metal with the longitudinal slit extending lengthwise of the tube thereof. When however the bolt and nut are again drawn up to fasten the parts in rigid relation, this fastening also aids in giving rigidity to the walls of the slit for holding the tube firmly about the end of the handle.

Having thus fully described my invention, what I claim as new and desire to secure by Letters Patent, is:

1. In a combination tool, a resilient tool holding member having a fork at one end and a tubular socket at the other, a handle adapted to be received within said socket, tang heads formed at the free ends of said fork, a plurality of individual tools rotatably mounted about a common axis between the ends of said fork and each provided with a tang head, all of said tang heads lying side by side and being formed with interlocking projections having inclined faces, and said socket member having a longitudinal slit extending substantially throughout the length thereof, and being secured to said handle only adjacent the end remote from said fork, whereby the resiliency of said fork is increased.

2. In a combination tool, a handle, and a tool holding fork carried thereby in alinement therewith, a plurality of tools rotatably mounted about a common axis between the ends of said fork, all of said tools being adjustable to an operative or idle position, one of said tools having a cutting edge and being so proportioned that when in idle position, such edge lies partially between the members of said fork, and another of said tools being so proportioned that, when in idle position, it lies against the handle outside of said fork, parallel with and adjacent said first mentioned tool, so as to constitute a guard for a portion of the cutting edge thereof.

3. In a combination tool, a tool holder, and a plurality of tools rotatably mounted about a common axis therein, each of said tools having a head provided with lateral projections, all of said heads being arranged side by side, and means for resiliently forcing said projections into interlocking engagement, said projections having opposing helicoidal surfaces, whereby they are enabled to ride freely upon one another.

4. A combination agricultural implement comprising a handle, a bifurcated head carried thereby and comprising a pair of separated tang heads, a series of independently movable individual tools, each having a tang head, all of said individual tool tang heads being arranged side by side between the tang heads of said bifurcated head, all of said tang heads having interlocking formations, said formations being so disposed that each of said tools can be adjusted to a position at substantial right angles to said handle or substantially parallel therewith, and no other positions, a pair of said individual tools, when arranged at right angles to the handle and in alinement with each other being constructed to constitute a single unitary implement, and means for clamping said tang heads together so as to maintain said tools in such adjusted positions.

In testimony whereof, I have hereunto subscribed my name in the presence of two subscribing witnesses.

JACOB A. HOLLANDER.

Witnesses:
 CONSTANT SOUTHWORTH,
 THERESA SILBER.